3,040,022
BLEACH FAST REACTIVE DYES
Roy E. Starn, Wilmington, Del., assignor to E. I. du Pont de Nemours and Company, Wilmington, Del., a corporation of Delaware
No Drawing. Filed Nov. 7, 1958, Ser. No. 772,425
3 Claims. (Cl. 260—153)

This invention relates to novel compositions of matter useful as reactive dyes for materials possessing in their structure exchangeable hydrogen atoms. More particularly, this invention deals with dyes for textile fiber and similar materials (including paper, leather, plastic film, etc.) which possess in their molecules or micelles reactive radicals such as OH, ONa or $NH_2$. Common illustrations of such materials are cellulosic fiber, wool, silk, nylon and polyvinyl alcohol film.

It is an object of this invention to provide novel, water-soluble, reactive dyes for materials of the above types, producing bright dyeings in the range of greenish-yellow to yellow, and being characterized particularly by fastness to bleach. Other objects and achievements of this invention will become apparent as the description proceeds.

Reactive dyes constitute a new type of dyes of relatively recent development. In these dyes, the dyeing capacity depends, not on affinity between the dye and fiber, but on direct chemical reaction (with covalent bonds) between the dye and certain reactive radicals in the fiber. The dyes in such cases may possess chloro-triazine radicals, which react with OH and $NH_2$ radicals occurring in the fibers. Hitherto, however, dyes of the reactive type have been deficient in bleach fastness, e.g., to treatment with sodium hypochlorite such as often follows or accompanies laundering, at home or in commercial establishments. Some of the reactive dyes now on the market are somewhat improved in this respect, and will withstand, for instance, treatment with chlorine at a concentration of 0.01% by weight of the treatment bath, but are nevertheless fugitive to bleach at a concentration of 0.3% by weight. Since commercial laundering often uses bleach baths of the higher concentration, it is clear that the bleach fastness of such a commercial dye is far from satisfactory.

I have now found that bright fiber-reactive dyeings, from an aqueous dye bath, in shades ranging from greenish-yellow to yellow, and characterized by outstanding fastness to bleach (even at chlorine concentrations of 0.3%) may be obtained by using the novel azo compounds of this invention, defined by the formula

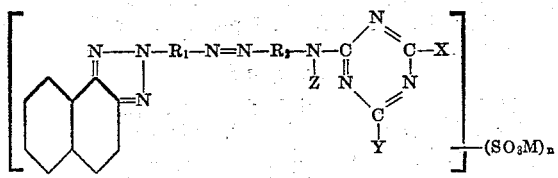

In this formula, $R_1$ is a benzenoid radical which may be substituted by Cl, $CH_3$, $C_2H_5$, $OCH_3$ or $SO_3M$; $R_2$ is a benzenoid radical which may be substituted by Cl, $CH_3$, $C_2H_5$, $OCH_3$ or COOH; Z is a radical of the group consisting of $CH_3$ and $C_2H_5$; X is a halogen atom of the group consisting of Cl and Br; Y is a member of the group consisting of Cl, Br, O-alkyl, S-alkyl, $NH_2$, NH-alkyl, N(alkyl)$_2$, mono- and di-hydroxyalkylamino, NH-aryl, N-alkyl-aryl, wherein said aryls may contain water solubilizing groups selected from sulfo and carboxy; the alkyls aforementioned being radicals of 1 to 4 C-atoms each and the aryls being aromatic radicals of not more than 10 C-atoms in their cyclic structure; M is an alkali metal; $n$ is an integer from 1 to 4 and designates the number of $SO_3M$ radicals in the molecule inclusive of any that may be present in Y, and at least one of the $SO_3M$ radicals is located in the naphthalene nucleus.

It will be noted that the novel dyes of this invention possess the following characteristics in their structure: They are monoazo dyes, having a triazine radical which bears at leaset one halogen atom (Cl or Br); they possess a 1,2-naphthotriazole radical; the triazine ring is attached to one of the components of the azo dye by means of a secondary amine radical; the entire molecule contains at least 2 and up to 6 or 7 sulfo groups, of which at least one is located in the naphthalene nucleus, and the dye chromophore, that is, the dye molecule exclusive of the triazine ring and its substituents, is free of OH and $NH_2$ groups.

In addition to possessing outstanding fastness to bleach, the dyeings produced by my novel dyes possess other desirable qualities, such as good fastness to light and good fastness to after-treatment with textile-finishing resins (such as crease-proofing or fiber-setting resins).

Generally speaking, my novel compounds are synthesized by diazotizing a nitroarylamine, such as p- or m-nitroaniline, and coupling same to an alpha or beta naphthylamine sulfonic acid (1 to 3 $SO_3H$ groups); oxidizing the ortho amino azo compound thus obtained in conventional manner (cupric sulfate or sodium hypochlorite) to produce a nitroarylnaphtho triazole compound; reducing the nitro group to the amine stage; diazotizing and coupling to a secondary aryl amine of the formula $R_2$—NH—Z, wherein $R_2$ and Z are as above defined, and then condensing the aminoazo dye thus obtained with a dihalogeno- or trihalogeno-triazine compound of the formula

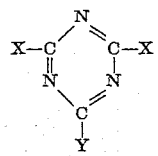

wherein X and Y are defined as above.

When Y is halogen, the said condensation is effected at ice temperatures (0° to 5° C.) in aqueous medium, whereby the resulting end product possesses two halogen atoms on the triazine ring. But if the reactive dye is to contain only one halogen in the triazine ring, either one of two routes may be resorted to: (a) reaction of the aminoazo compound, mole per mole, with a cyanuric halide, followed by reaction with one mole of a compound which introduces a Y group other than halogen, or (b) first reacting a compound of the latter group, mole per mole, with a cyanuric halide, followed by reaction with one mole of the aminoazo dye. In either route, the reaction with cyanuric halide is effected at ice temperatures (0° to 5° C.) in aqueous medium, and the second halogen atom on the triazine ring is reacted at a temperature in the range of 10° to 70° C., likewise in aqueous medium.

The compounds which are employed to form a Y group other than halogen are, for instance, a lower alcohol (1 to 4 C-atoms), a lower mercaptan, a monoalkylamine, a dialkylamine, an alkanolamine, an arylamine, an N-alkyl-arylamine, or an aryl- or N-alkylarylamine bearing from 1 to 3 water-solubilizing groups (e.g. $SO_3H$ or COOH).

The final dye is generally salted out with common salt; hence its sulfo groups have the form $SO_3Na$. It may, however, be also recovered, in known manner, in the form of a potassium or lithium salt, or it may be converted into one or the other of these salts, in known manner, after isolation in the form of sodium salt.

Without limiting this invention, the following examples are given to illustrate my preferred mode of operation. Parts mentioned are by weight.

Example 1

A quantity of p-nitroaniline was diazotized in conventional manner and coupled to 8-amino-1,3,6-naphthalene-tri(sodium sulfonate). Upon salting out and filtering of the product, it was subjected to oxidation in conventional manner (using cupric sulfate and ammonia; see, for instance Example 1 of U.S.P. 2,700,044) to form the p-nitrophenyl-1,2-naphthotriazole. The product was again isolated and subjected to reduction with iron and acetic acid (at pH 4.0 to 4.5) to reduce the nitro group to the amino stage. The aminotriazole thus produced corresponds to the formula

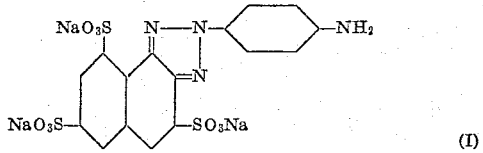

(I)

To a solution of 170 parts of the aminotriazole (I) and 21.4 parts of sodium nitrite in 710 parts of water at pH 9 and at 10° C., were added 103 parts of 10 N hydrochloric acid. After stirring for one hour at 10° to 15° C. the excess nitrous acid was removed with sulfamic acid. The aminoazotriazole compound (II)

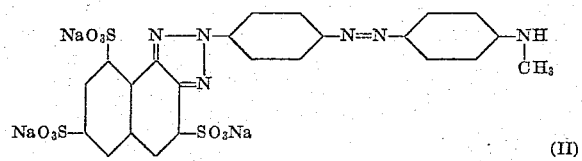

(II)

was prepared by adding 34.5 parts of N-methylaniline and stirring overnight. The coupling solution was cooled to 0° to 5° C. by the addition of ice. There was then added an acetone solution containing 57 parts of cyanuric chloride. Simultaneously there were added 67 parts of 5 N NaOH so as to maintain a pH of 2. Then another 160 parts of 5 N NaOH were added, so as to bring the pH to 6.5. After stirring for 30 minutes, the reaction to dichlorotriazine (III)

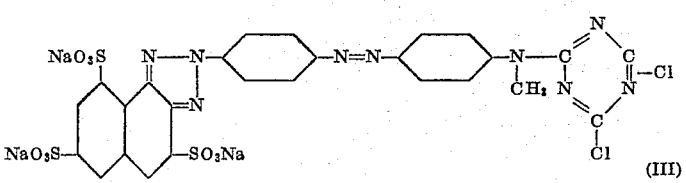

(III)

was complete. This solution of (III) was divided into three equal portions.

To one-third of the above solution at 15° C. there were added 11.3 parts of aniline. The solution was maintained at pH 7 to 8 for one hour by the dropwise addition of a sodium hydroxide solution. The dye solution was heated to 45° C. and sufficient NaCl was added to produce a 20% NaCl solution by volume. The product was separated by filtration and dried. The isolated product which is believed to have the structure

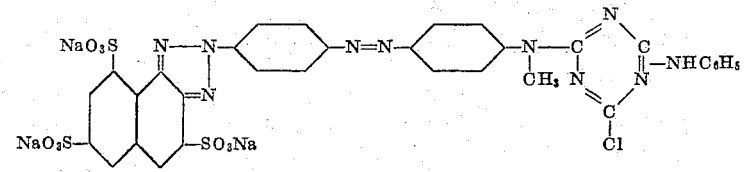

is a yellow-brown powder which dissolves in water to give a yellow solution. When applied to cotton broadcloth from an aqueous bath by the method described in Example 11 hereinbelow, it exhibits a bright yellow shade having excellent light and wash fastness and outstanding fastness to chlorine bleach and to peroxide.

Example 2

If in Example 1, one-third of the solution of dichlorotriazine (III) is treated with 12.6 parts of diethanolamine instead of 11.3 parts of aniline, there is obtained another yellow dye of the probable structure

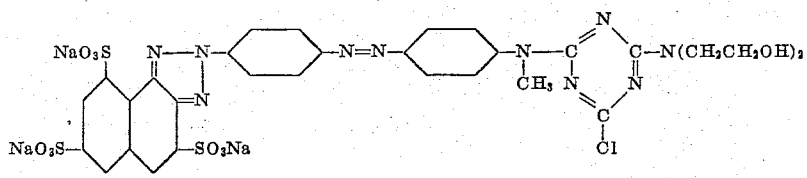

When applied to cotton broadcloth from an aqueous bath by the method described in Example 11 hereinbelow, it has similar shade and fastness properties to the dye of Example 1.

Example 3

If in Example 1, one-third of the solution of dichlorotriazine (III) is treated with 10.7 parts of 3-methoxypropylamine instead of 11.3 parts of aniline, there is obtained a third yellow dye of probable structure

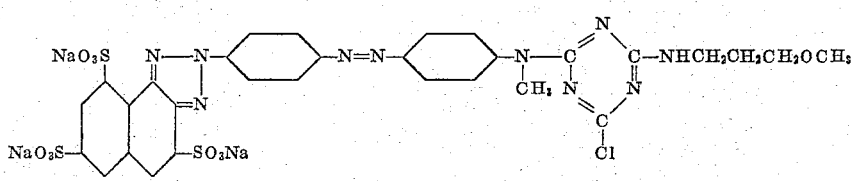

When applied to cotton broadcloth from an aqueous bath by the method described in Example 11 hereinbelow, it has similar shade and fastness properties to the dye of Example 1.

In a similar manner, the dichlorotriazine (III) may be reacted with a lower alcohol, e.g. methyl, ethyl or butyl alcohol, or with an alkyl mercaptan, e.g. ethyl or propyl mercaptan, to replace one of the chlorine atoms with the corresponding O-alkyl or S-alkyl group.

Example 4

If, in Example 1, the solution of dichlorotriazine (III) is salted and the precipitate is separated by filtration and dried, the resultant yellow powder corresponds to Formula (III). When applied to cotton broadcloth from an aqueous bath by the method described in Example 12 hereinbelow, it exhibits a slightly greener shade than the dye of Example 1. It has excellent light and wash fastness and outstanding fastness to chlorine bleach and to peroxide.

Example 5

A slurry was prepared by dissolving 9.78 parts of cyanuric chloride in 51 parts of acetone and adding this solution to a mixture of 83 parts of water and 93 parts of ice. To the slurry was added a solution prepared by dissolving 10.3 parts of sodium metanilate in 40 parts of water and 34 parts of ice, adjusting the pH to 5 and adding 7.62 parts of crystalline sodium acetate. After there was no longer diazotizable amine present, the pH was adjusted to 5.5 with 6.6 parts of 10 N NaOH and then 50 parts of water were added. This solution of primary condensation product of sodium metanilate and cyanuric chloride was added to a solution of the aminoazotriazole compound (II), of Example 1, which contained 30.7 parts of (II) in 310 parts of water at pH 5.5 and at 57° C. The solution was stirred for three hours at 50° to 55° C. while the pH was maintained at 4.8 to 5.5 by the dropwise addition of 7.2 parts of 10 N NaOH. The product was precipitated by the addition of 155 parts of sodium chloride, and separated by filtration.

The isolated product, which is believed to have the structure,

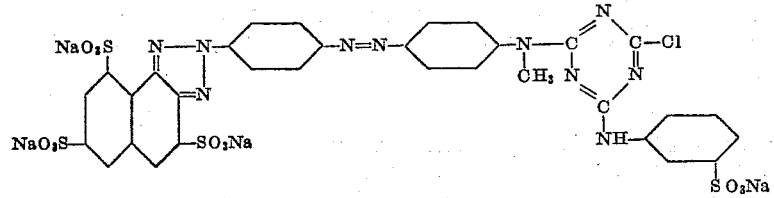

is a tan power which gives shades on cotton very similar to those obtained from the dye of Example 1.

Example 6

If in Example 5 the 10.3 parts of sodium metanilate are replaced by 13.3 parts of 2-amino-p-benzenedisulfonic acid a dye is obtained which is similar in shade and fastness properties to the dye of Example 5.

Example 7

A quantity of 3-amino-4-methoxy-6-nitrobenzenesulfonic acid was diazotized in conventional manner and coupled to 3-amino-2,7-naphthalene disodium sulfonate. Upon filtering off the product, it was subjected to oxidation in conventional manner (using sodium hypochlorite in a slightly alkaline solution; see, for instance, Example 1 of U.S.P. 2,713,055) to form a 1,2-naphthotriazole.

The product was again isolated and subjected to reduction with iron and acetic acid in customary manner to reduce the nitro group to an amino group. The aminotriazole thus produced corresponds to the formula

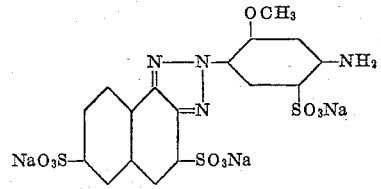

This aminotriazole was diazotized and coupled to N-methylaniline, condensed with cyanuric chloride to form a dichlorotriazine and this dichlorotriazine was then condensed with aniline according to the methods described in Example 1. The structure of the product is believed to be

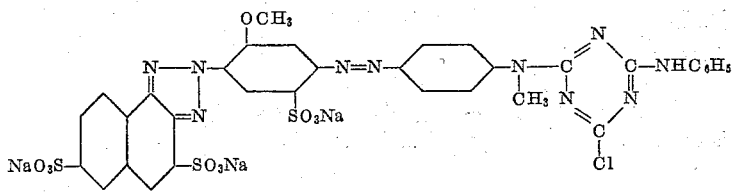

When dyed by the procedure described in Example 11 hereinbelow, it gives a redder-yellow shade than that obtained from the dye of Example 1. The dye of this example also has excellent light and wash fastness and outstanding fastness to chlorine bleach.

Example 8

To a solution at 5° C. consisting of 130 parts of water, 11.3 parts of the aminotriazole (I) of Example 1 and 1.52 parts of sodium nitrite was added 5.8 parts of 10 N hydrochloric acid. After one hour the excess nitrous acid was destroyed with sulfamic acid and there was then added 2.42 parts of N-methyl-m-toluidine dissolved in 25 parts of water and 2.3 parts of 10 N hydrochloric acid. The coupling was stirred overnight at room temperature. The solution was adjusted to pH 6 and heated to 55° C. To this solution of aminoazotriazole was added a solution of the primary condensation product of cyanuric chloride and sodium metanilate prepared as follows: A solution of 3.9 parts of sodium metanilate in 22 parts of water was adjusted to pH 6 and 3 parts of crystalline sodium acetate were added. This solution was added to a slurry prepared by adding a solution of 3.7 parts of cyanuric chloride dissolved in 16 parts of acetone to 30 parts of ice and 10 parts of water. After there was no longer diazotizable amine present the pH was adjusted to 6.5 with a sodium hydroxide solution.

The solution of aminoazotriazole and the primary condensation product at 50° to 55° C. was maintained at pH 5 to 6 by the dropwise addition of 17.7 parts of 2 N sodium hydroxide. The product was precipitated by the addition of 70 parts of sodium chloride and separated by filtration.

The isolated product which is believed to have the structure below is a tan powder which gives dyeings on cotton very similar to those obtained from the dye of Example 5.

The m or p-nitroanilines named in Examples 1, 7 and 10 above may be replaced by other m- or p-nitroanilines

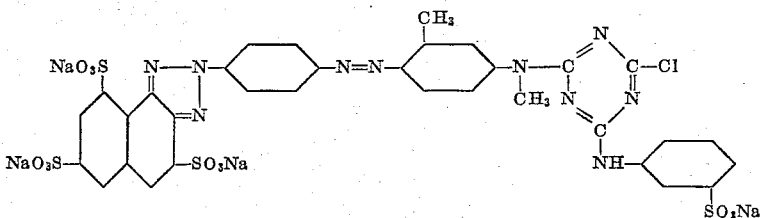

In a similar manner, the N-methyl-m-toluidine used in this example may be replaced by an equivalent amount of N-ethyl-m-toluidine, m-ethyl (chloro or methoxy)-N-methylaniline or 2,5-dimethyl-N-methylaniline to produce light fast and bleach fast reactive dyes.

Example 9

If in Example 8 the N-methyl-m-toluidine is replaced by 3.3 parts of N-ethylanthranilic acid the product obtained gives dyeings on cotton which have outstanding fastness to chlorine bleach.

Example 10

If in Example 8 the aminotriazole (I) of Example 1 is replaced by 11.3 parts of an aminotriazole of the structure

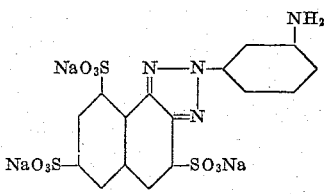

(prepared by using m-nitroaniline instead of p-nitroaniline in the process of Example 1) the product obtained gives yellow dyeings on cotton which are somewhat greener in shade than those obtained from the dye of Example 8, and which have outstanding fastness to chlorine bleach.

The mode of application of my novel compounds to fiber having reactive OH or $NH_2$ groups is not much different from that employed with other reactive dyes now on the market. The following examples will illustrate the procedure:

Example 11

*Dyeing procedure.*—A 4.15% aqueous solution of the dye of Example 1 was padded on cotton broadcloth at 70° C. in such a manner that the increase in weight by the fabric was 60%. After the fabric was dried it was re-padded in the same manner with a solution which contained 25% sodium chloride and 1.2% sodium hydroxide. The wet fabric was steamed or two minutes and then scoured at the boil or two minutes with a solution containing 0.3% sodium carbonate and 0.2% of the condensation product of 20 moles of ethylene oxide with one mole of a $C_{18}$ alcohol. The qualities of the dyeing thus produced were as reported in Example 1.

Example 12

*Dyeing procedure.*—The dichlorotriazine dye of Example 4 was applied to cotton broadcloth in exactly the same manner as described in Example 11 except that the dye solution was padded at room temperature (20° to 25° C.). The results were as reported in Example 4.

It will be understood that the details of the above examples may be varied widely without departing from the spirit of this invention. For instance, in lieu of the particular amino-naphthalene-sulfonic acids named in the above examples, any of the following may be used:

6-(or 7-)amino-1,3-naphthalene-disulfonic acid
3-amino-1,5-naphthalene-disulfonic acid
8-amino-1,6-naphthalene-disulfonic acid
4-amino-2,7-naphthalene-disulfonic acid
4-(5-, 6- or 8-)amino-1-naphthalene-sulfonic acid
5-(or 8-)amino-2-naphthalene-sulfonic acid.

which contain Cl, $CH_3$ or $OCH_3$ substituents in any of their remaining positions in the nucleus.

In lieu of the secondary arylamines employed as coupling component following the second diazotization in any of the above examples, any of the following may be used:

N-methyl-o-toluidine,
5-chloro-2-methyl-N-methylaniline,
N-methyl-o-anisidine,
2,5-dimethoxy-N-methylaniline,
5-methyl-2-methoxy-N-methylaniline, as well as any of those named in Examples 8 and 9.

In Examples 5, 6, 8, 9 and 10, instead of using the primary condensation product of cyanuric chloride and sodium metanilate, other primary condensation products of cyanuric chloride may be employed. For instance, one may use the condensation products of cyanuric chloride (on the first Cl-atom) with any of the following: ammonia; primary aliphatic amines, such as methylamine, ethylamine, butylamine, monoethanolamine, and 3-methoxypropylamine; common primary aromatic amines, such as o- m- or p-toluidine, o- m- or p-chloraniline, and anthranilic acid; sulfonated aromatic amines, such as m-aminobenzene-sulfonic acid, 2-amino-p-benzene-disulfonic acid, 7-amino-1,3-naphthalene-disulfonic acid, and 8-amino - 1,3,6 - naphthalene-trisulfonic acid; secondary aliphatic amines, such as dimethylamine, dibutylamine, methylisopropyl-amine, diethanolamine, and N-methyl-3-methoxypropylamine; secondary aromatic amines, such as N-methylaniline or N-ethyl-m-toluidine; etc.

Other variations in procedure or in choice of initial materials will be readily apparent to those skilled in the art.

I claim as my invention:
1. A compound of the formula

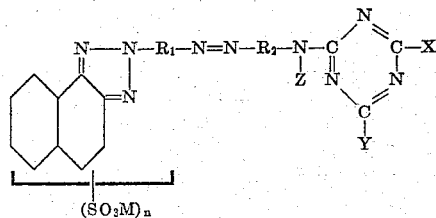

wherein $R_1$ is a phenylene radical of whose remaining nuclear valencies at least two are satisfied by hydrogen while the remaining valencies are satisfied by members of the group consisting of H, Cl, $CH_3$, $C_2H_5$, $OCH_3$ and $SO_3M$, M being an alkali metal; $R_2$ is a phenylene radical of whose remaining nuclear valencies at least two are satisfied by hydrogen while the remaining valencies are satisfied by members of the group consisting of H, Cl, $CH_3$, $C_2H_5$, $OCH_3$ and COOH; Z is a radical of the group consisting of methyl and ethyl; X is a halogen atom of the group consisting of Cl and Br; Y is a member of the group consisting of $C_1$, Br, O-alkyl, S-alkyl, primary amino, monoalkyl amino, dialkylamino, monoalkanolamino, dialkanolamino, arylamino, N-alkyl-arylamino, and arylamino and N-alkyl-arylamino radicals bearing water-solubilizing groups, the alkyls and alkanols aforementioned being radicals of 1 to 4 C-atoms each and the aryls being aromatic radicals of not more than 10 C-atoms in their cyclic structure; M is an alkali-metal and n is an integer from 1 to 4, at least one of the SO₃M radicals but not more than three being located in the naphthalene nucleus.
2. The compound of the formula
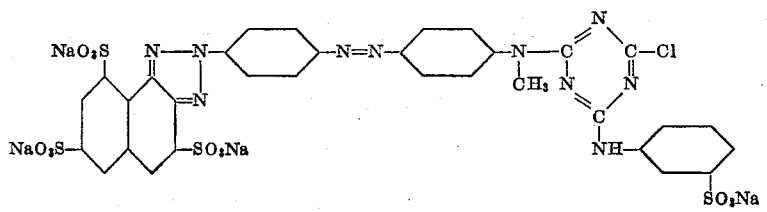
3. The compound of the formula
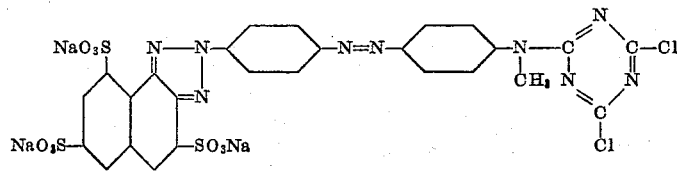
References Cited in the file of this patent
UNITED STATES PATENTS
| | | |
|---|---|---|
| 1,667,312 | Fritzsche et al. | Apr. 24, 1928 |
| 2,493,975 | Kaiser | Jan. 10, 1950 |
| 2,795,577 | Feeman | June 11, 1957 |
| 2,860,129 | Gunst | Nov. 11, 1958 |
| 2,873,269 | Fasciati et al. | Feb. 10, 1959 |
| 2,951,071 | Tilley | Aug. 30, 1960 |
OTHER REFERENCES
Gilman: "Organic Chemistry," vol. III, pages 293–294.

UNITED STATES PATENT OFFICE
CERTIFICATE OF CORRECTION

Patent No. 3,040,022   June 19, 1962

Roy E. Starn

It is hereby certified that error appears in the above numbered patent requiring correction and that the said Letters Patent should read as corrected below.

Column 2, line 57, for "a" read -- the --; column 4, line 1, after "to", second occurrence, insert -- form --; lines 4 to 10, the right-hand portion of formula (III) should appear as shown below instead of as in the patent:

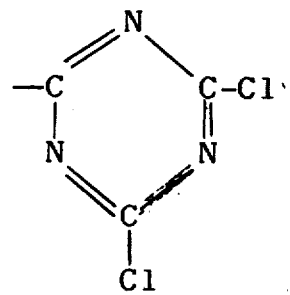

same column 4, lines 22 to 30, the right-hand portion of the formula should appear as shown below instead of as in the patent:

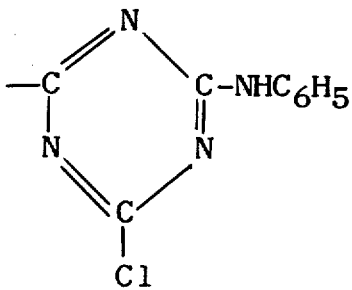

column 5, line 59, for "power" read -- powder --; column 7, lines 52 and 53, for "or", each occurrence, read -- for -- ; column 8, line 68, for "$C_1$" read -- Cl --.

Signed and sealed this 16th day of October 1962.

(SEAL)
Attest:

ERNEST W. SWIDER

Attesting Officer

DAVID L. LADD

Commissioner of Patents